March 11, 1958     R. G. PIETY     2,826,066
FLOWMETER
Filed May 1, 1950     2 Sheets-Sheet 1
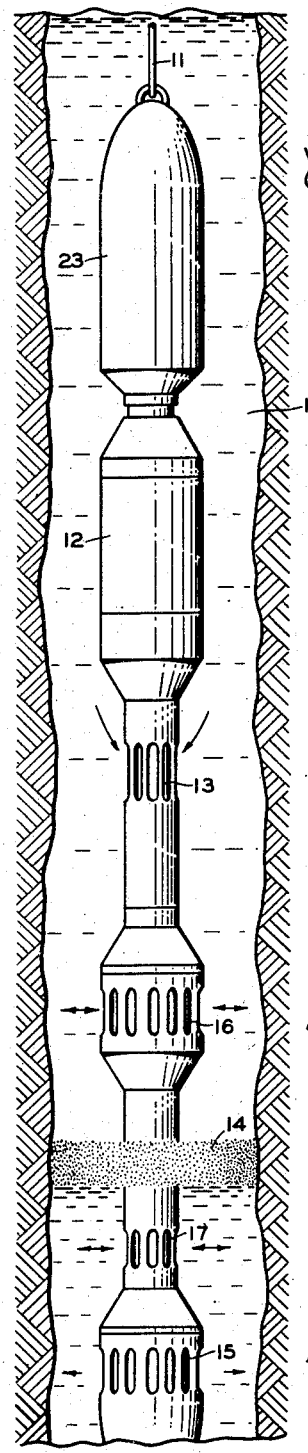
FIG. 1
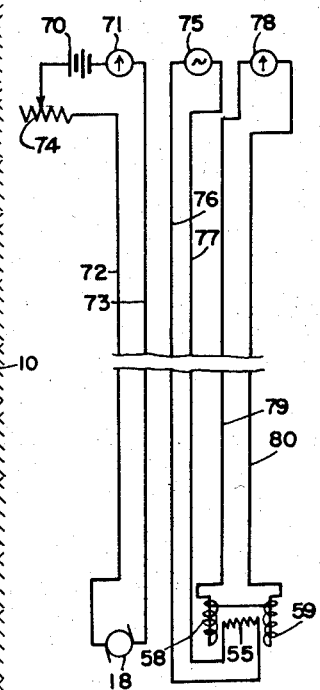
FIG. 4
| FIG. 2a |
| FIG. 2b |
| FIG. 2c |
FIG. 3
INVENTOR.
R. G. PIETY
BY Hudson & Young
ATTORNEYS

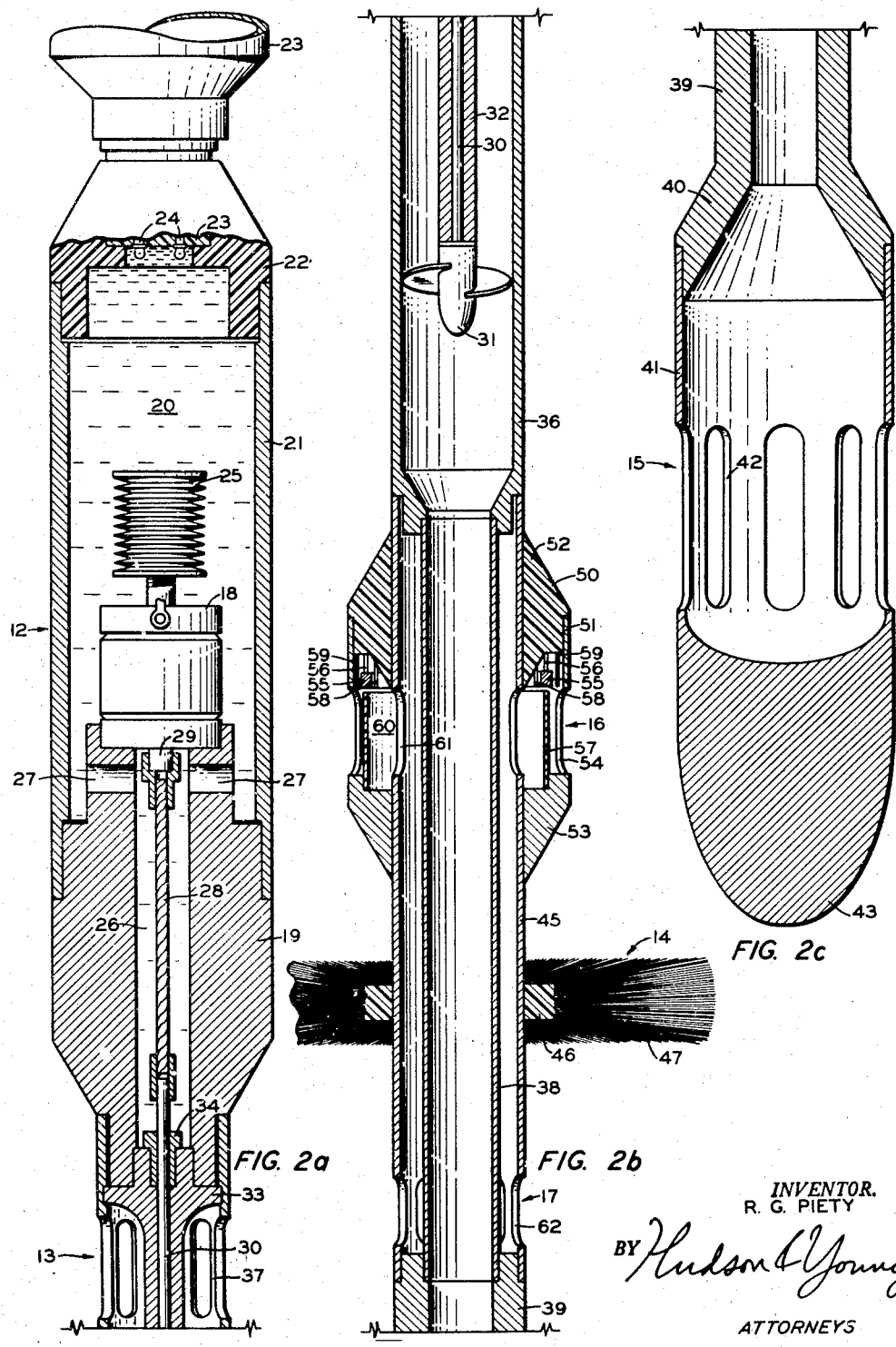

United States Patent Office 2,826,066
Patented Mar. 11, 1958

2,826,066

FLOWMETER

Raymond G. Piety, Bartlesville, Okla., assignor to Phillips Petroleum Company, a corporation of Delaware Application May 1, 1950, Serial No. 159,264

11 Claims. (Cl. 73—155)

This invention relates to flowmeters. In one specific aspect, it relates to a differential flowmeter for determining when fluid is being injected into a well at a proper rate.

Heretofore, considerable difficulty has been experienced in determining the proper rate of water injection into a well. During a water injection operation, a packer is inserted into the well at a predetermined depth, and water or other fluid is injected below this packer. It is desirable that the water flow rate be maintained at a sufficiently high value that as much water as possible enters the formation. If the rate at which water is pumped into the well is excessive, a very efficient packing device must be utilized to prevent leakage of fluid around the packer to formations above the desired zone. However, when the water is being supplied at an optimum rate, it enters the formation readily and the necessity for providing a tight packing device is substantially reduced. In this connection, it will be noted that it is quite difficult to provide a packer which will not leak under the high pressure conditions existing during a water injection operation.

It is an object of this invention to provide a metering device to indicate when the proper pumping rate is obtained.

It is a further object to provide a differential flowmeter for indicating the rate of passage of fluid past an obstruction, such as a packer, in a well.

It is a still further object to provide a flowmeter for accurately determining the rate at which water is entering formations adjacent a water injection well.

It is a still further object to provide apparatus which is rugged in construction, durable, and reliable in operation.

Various other objects, advantages and features of the invention will become apparent from the following detailed description taken in conjunction with the accompanying drawings, in which:

Figure 1 is a view showing the apparatus of my invention suspended in a well;

Figures 2a, 2b and 2c are, collectively, a vertical sectional view of the apparatus of Figure 1;

Figure 3 is a view illustrating the arrangement of the parts of Figure 2; and

Figure 4 is a schematic representation of the electrical circuitry employed to operate the flow measuring apparatus of this invention.

Referring now to Figure 1, the apparatus of my invention is supported in a well 10, preferably a water injection well, by a cable 11. The apparatus includes a motor-pump assembly 12 which pumps fluid, such as water, from an inlet 13 positioned above a packing device 14 to an outlet 15 below the packing device 14. The current consumption of the motor is so calibrated that the rate at which it pumps water when there is zero flow from 16 to 17 is accurately known. In accordance with the invention, an interior passage of the apparatus communicates with an outlet 16 positioned above packing device 14 and an outlet 17 positioned below the packing device, this passage having a flowmeter associated therewith to indicate flow of liquids therethrough.

In the operation of the apparatus, when water is pumped through outlet 15 at the exact rate at which it enters the formations below the packer, there is no flow of liquid, in either direction, through outlets 16, 17 or the flowmeter associated with the passage connecting these outlets. That is, the flowmeter has a null reading and the calibrated motor-pump unit then indicates very accurately the rate at which the input well is taking water. When this condition occurs, there is little or no tendency for liquid to flow in either direction past the packer 14 and, accordingly, this packing need not be particularly tight. When the flowmeter indicates that water is passing from outlet 16 to outlet 17, it is known that the motor-pump unit is not pumping water into the formation at a sufficient rate and, therefore, that water is passing through the flowmeter and probably downwardly through the packing device. The pumping rate can then be increased by increasing the electrical current rate to the motor 18 by any such conventional means as rheostat 74 until a null reading is obtained upon the flowmeter. Conversely, if the motor-pump unit is supplying too much water to the formation, water flows upwardly from outlet 17 to outlet 16 and, probably, upwardly around the packer. When the flowmeter indicates this condition, the pumping rate can be decreased by decreasing the electrical current rate to the motor 18 to supply an optimum amount of water to the formation. Accordingly, the apparatus of my invention enables water to be pumped at an optimum rate into the formation without the use of a tight packing device.

The detailed construction of the apparatus is shown in Figure 2 in which it will be noted that the motor-pump assembly 12 includes a motor 18 carried at the upper end of an annular block 19 and enclosed within a chamber 20 defined by block 19, a cylindrical casing 21 and an end cap 22, this latter part being attached to the cable 11 by a housing 23 which may contain batteries or other electrical equipment. Positioned at the upper end of cap 22 is a plate 23 which incorporates a plurality of terminals 24 to supply current to the motor. The chamber 20 is filled with an insulating liquid, such as oil, and it incorporates a pressure adjusting bellows 25 which is preferably secured to the top of motor 18. Motor 18 is connected in series relation with a current source 70 and a galvanometer 71 positioned at the surface by leads 72 and 73 which extend through the bore hole, Figure 4. Current source 70 can be adjusted to increase or decrease the pump rating, as explained in the preceding two paragraphs, by any conventional electrical control means, such as rheostat 74.

A passage 26 in annular member 19 communicates with chamber 20 through openings 27 and this passage contains a flexible rod 28 coupling the drive shaft 29 of the motor to an impeller rod 30 which carries a pump impeller 31. The rod 30 is mounted within a sleeve 32 which has an integral flanged head 33 abutting annular member 19 and carrying a bearing 34 for the impeller rod 30.

The impeller 31 is housed in a tube 36 which is secured to annular member 19 at its upper end and is provided with openings 37 defining the inlet 13. The lower end of tube 36 is joined to a smaller tube 38 which, in turn, is connected to a tubular member 29 having a flared lower portion 40 which receives an enlarged cylindrical discharge unit 41. The unit 41 is provided with openings 42 defining the outlet 15 and it has an integral weight portion 43 tending to properly orient the apparatus in the well.

It will be evident that operation of the motor 18 rotates impeller 31 to pump liquid from inlet 13 through tubes 36, 38 and 39 to the discharge openings 42 of outlet 15. The pump is so calibrated that the amount of liquid handled by it is determined at the surface by the amount of current drawn by the motor. Mounted concentrically with the tube 38 is an enlarged tube 45 carrying a packing device 14 which may be of any desired construction, it not being necessary that the packing device form a tight cell with the walls of the well. Preferably and advantageously, the packing device is of the type shown in my copending application Serial No. 77,634, filed February 21, 1949, entitled Packing Device, which matured into Patent Number 2,654,433 on October 6, 1953, this device comprising an annular sleeve 46 of hard rubber carrying a set of radially extending bristles which extend outwardly to and engage the walls of the well, these bristles being impregnated with a suitable sealing component, such as grease.

A flowmeter 50 is disposed in the upper part of tube 45 above the packing device 14. Though this flowmeter may be of any suitable type, it is preferred to utilize the flowmeter shown in my copending application, Serial No. 105,295, filed July 18, 1949, entitled Flowmeter which matured into Patent Number 2,709,365 on May 31, 1955. For purposes of explanation, this flowmeter includes a cylindrical member 51 carried by upper and lower supports 52 and 53, respectively, this member being provided with openings 54 defining the outlet 16 of Figure 1. The flowmeter further includes a heater ring 55 suspended from support 52 by rods 56, the lower edge of the heater being closely spaced to a tube 57 of heat insulating material. Heater ring 55 is connected to a voltage source 75 positioned at the surface by leads 76 and 77 which extend through the bore hole, Figure 4. An inner set 58 and an outer set 59 of thermocouple junctions are disposed on opposite sides of the heater ring and are connected in circuit with a meter 78 positioned at the surface by leads 79 and 80 which extend through the bore hole, Figure 4. These thermocouple junctions measure the temperature of the water both before it is incident upon the heater ring 55 and after it is incident upon the heater ring 55. The difference in temperature between the two sets of thermocouples is a function of the rate of flow of liquid through inlet 16 to the inner part 60 of the flowmeter or, in the opposite direction, from the inner part 60 to outlet 16. In the absence of fluid flow past thermocouples 58 and 59, these two thermocouples are at the same temperature so that the reading of meter 78 is zero.

The inner part 60 communicates with the interspace between tubes 38, 45 through openings 61 and the tube 45 is provided, at its lower end, with openings 62 defining the outlet 17 below packer 14. It will be evident that liquid may flow from the outlet 17 through the passage between tubes 38, 45, and flowmeter 50 to outlet 16 or, in the opposite direction, from outlet 16 through the flowmeter and the interspace between tubes 38, 45 to the outlet 17. The flowmeter indicates the rate of flow of this liquid and, when the fow rate is zero, it is known that water is being pumped into the formation at an optimum rate, as explained in connection with Figure 1.

It will be apparent, therefore, that the detailed apparatus shown in Figure 2 performs the functions set forth in connection with the description of Figure 1, and that I have attained the objects of my invention in providing flow measuring apparatus for determining the optimum rate of water injection into a well, this result being attained by determining the amount of flow of fluid in either direction past a packing device, which need not necessarily form a tight seal with the walls of the well. In particular, in this connection, the packer need only be tight enough to permit at least a portion of the water to flow through flowmeter 50 when it is moving in either direction past the packing device.

While the invention has been described in connection with a present, preferred embodiment thereof, it is to be understood that this description is illustrative only and is not intended to limit the invention, the scope of which is defined by the appended claims.

I claim:

1. Flow measuring apparatus comprising in combination, an elongated tube, a packing device disposed exteriorly of said tube to seal the region between said tube and the walls of a well, said tube having single outlet means at each end thereof, said outlet means being disposed above and below said packer, respectively, means for indicating flow of liquid through said elongated tube, a second tube disposed within said elongated tube and mounted concentrically therewith, an annular member communicating with the lower end of said second tube, said member having a flared portion at its lower end, a cylindrical member secured to said flared portion and having an integral weight portion at its lower end, there being openings formed in said cylindrical member to permit passage of fluid from said second tube through said annular member and said cylindrical member, a third tube communicating with the upper end of said second tube, a rotary impeller positioned within said third tube, a rod for driving said impeller, a sleeve secured to said third tube and surrounding said rod to support the impeller within said third tube, said sleeve having a flared portion at the upper end thereof forming a bearing for receiving said rod, said third tube having an opening formed therein below said flared portion and above said impeller, a motor for driving said rod and thereby said impeller to pass fluid from a zone above said packing device to a zone below said packing device through said second and third tubes, and means responsive to the speed of rotation of said impeller to indicate the rate of fluid flow through said second and third tubes whereby the total flow between said two zones passes through said second and third tubes when the indicated flow through said elongated tube is zero.

2. Flow measuring apparatus comprising in combination, an elongated tube, a packing device disposed exteriorly of said tube to seal the region between said tube and the walls of a well, said tube having single outlet means at each end thereof, said outlet means being disposed above and below said packer, respectively, means for indicating flow of liquid through said elongated tube, a second tube disposed within said elongated tube and mounted concentrically therewith, an annular member communicating with the lower end of said second tube, said member having a flared portion at its lower end, a cylindrical member secured to said flared portion and having an integral weight portion at its lower end, there being openings formed in said cylindrical member to permit passage of fluid from said second tube through said annular member and said cylindrical member, a third tube communicating with the upper end of said second tube, a rotary impeller positioned within said third tube, a rod for driving said impeller, a sleeve secured to said third tube and surrounding said rod to support the impeller within said third tube, said sleeve having a flared portion at the upper end thereof forming a bearing for receiving said rod, said third tube having openings formed therein below said flared portion and above said impeller, an annular block secured to the flared portion of said sleeve, a casing carried by said block, an end cap defining, with said casing and said block, a sealed chamber adjacent the upper end of said rod, said cap having electrical terminal members extending therethrough, a liquid insulating material in said chamber, a motor in said chamber supported by said block, a flexible rod joining the drive shaft of said motor and said impeller-driving rod to pass fluid from a zone above said packing device to a zone below said packing device through said second and third tubes, and means responsive to the speed of rotation of said impeller to indicate the rate of fluid flow through said second and third tubes whereby the total flow between said two zones passes through said second and third tubes when the indicated flow through said elongated tube is zero.

3. Flow measuring apparatus comprising in combination, a tube, a packer mounted on said tube for sealing the region between said tube and the walls of a well, said tube having single outlet above said packer and a single outlet means below said packer, fluid flow indicating means positioned at the upper end of said tube and including a heater ring, two sets of thermocouple junctions disposed at opposite sides of said ring, and means defining a passage for liquid between the exterior of the apparatus, the outer set of thermocouple junctions, the ring, the inner set of thermocouple junctions and the upper outlet of said tube whereby liquid flow through said tube is indicated by the potential difference between said thermocouple junctions, a second tube disposed within said first tube and mounted concentrically therewith, an annular member communicating with the lower end of said second tube, said member having a flared portion at its lower end, a cylindrical member secured to said flared portion and having an integral weight portion at its lower end, there being openings formed in said cylindrical member to permit passage of fluid from said second tube through said annular member and said cylindrical member, a third tube communicating with the upper end of said second tube, a rotary impeller positioned within said third tube, a rod for driving said impeller, a sleeve secured to said third tube and surrounding said rod to support the impeller within said third tube, said sleeve having a flared portion at the upper end thereof forming a bearing for receiving said rod, said third tube having an opening formed therein below said flared portion and above said impeller, an annular block secured to the flared portion of said sleeve, a casing carried by said block, an end cap defining, with said casing and said block, a sealed chamber adjacent the upper end of said rod, said cap having electrical terminal members extending therethrough, liquid insulating material in said chamber, a motor in said chamber supported by said block, a flexible rod joining the drive shaft of said motor and said impeller-driving rod said impeller passing fluid from a zone above said packer to a zone below said packer through said second and third tubes, and means responsive to the speed of rotation of said impeller to indicate the rate of fluid flow through said second and third tubes whereby the total flow between said two zones passes through said second and third tubes when the indicated flow through said first-mentioned tube is zero.

4. Flow measuring apparatus comprising, in combination, a casing adapted to be lowered into a well, packing means secured to said casing and extending outwardly therefrom to engage the wall of the well, first and second conduits in said casing, the first ends of said conduits communicating with a region exterior of said casing on one side of said packing means and the second ends of said conduits communicating with a region exterior of said casing on the second side of said packing means, means for passing fluid through said first conduit at a variable rate, means to measure the rate of fluid flow through said first conduit, and means to indicate fluid flow through said second conduit.

5. The combination in accordance with claim 4 wherein said means for passing fluid through said first conduit comprises an impeller positioned in said first conduit and a variable speed motor coupled to said impeller, and wherein said means to measure the rate of fluid flow through said first conduit comprises means to measure the speed of rotation of said impeller.

6. The combination in accordance with claim 4 wherein said means to indicate fluid flow through said second conduit comprises a heating element positioned within said second conduit, first temperature sensing means positioned within said second conduit on one side of said heating element, and second temperature sensing means positioned within said second conduit on the second side of said heating element.

7. Flow measuring apparatus comprising, in combination, a first tube adapted to be suspended in a well, packing means secured to said first tube and extending outwardly therefrom to engage the wall of the well, said first tube having a first opening on one side of said packing means and a second opening on the second side of said packing means, a second tube positioned within said first tube, said second tube having a first opening on said one side of said packing means and a second opening on said second side of said packing means, the openings of said second tube communicating with regions exterior of said first tube, an impeller disposed within said second tube, a variable speed motor connected to said impeller to rotate said impeller, means for measuring the rate of fluid flow through said second tube as produced by said impeller, and means to indicate fluid flow through said first tube.

8. Flow measuring apparatus comprising, in combination, an elongated tube, a cable attached to said elongated tube to suspend same in a well, a brush packer secured to said tube and extending outwardly therefrom to seal the region between said elongated tube and the wall of the well, said elongated tube having an outlet at each end thereof, said outlets being disposed above and below said packer, respectively, means disposed within said elongated tube to indicate the flow of liquid therethrough, a second tube disposed within said elongated tube and mounted concentrically therewith, the outer diameter of said second tube being less than the inner diameter of said first tube, a rotatable impeller positioned within said second tube, a motor connected to said impeller to rotate said impeller, means to measure the speed of rotation of said impeller to indicate the rate of fluid flow through said second tube whereby the total flow from one side of said packer to the second side of said packer passes through said second tube when the indicated flow through said elongated tube is zero.

9. Flow measuring apparatus comprising, in combination, a casing adapted to be lowered into a well, packing means secured to said casing at a region intermediate the ends thereof and extending outwardly to engage the wall of the well, said casing having walls defining first and second flow paths, the first ends of said flow paths being in communication with a region exterior of said casing on one side of said packing means and the second ends of said flow paths being in communication with a region exterior of said casing on the second side of said packing means, means for pumping fluid through said first flow path at a variable rate, means responsive to said pumping means to indicate the rate of fluid flow through said first flow path, and means to indicate fluid flow through said second flow path whereby the indicated flow through said first flow path represents the total flow between said first and second regions when the indicated flow through said second flow path is zero.

10. Liquid flow measuring apparatus comprising, in combination, a main conduit consisting in part of two always open looped parallel conduits, means for passing liquid at a first rate of liquid flow, which is to be measured, through said main conduit and such of said looped parallel conduits as may receive the same, an electric motor-driven impeller in the first of said looped parallel conduits for pumping liquid through the same at a second variable regulated rate of flow, a variable electric power supply connected to said electric motor and a meter connected in said power supply calibrated to indicate power supplied thereto and thereby constitute a first flowmeter indicating said second rate of flow accurately only when there is zero flow in the second of said looped parallel conduits, and a second flowmeter constructed to be sensitive to indicate when there is a low rate of flow and when there is zero flow in said second looped parallel conduit positioned in the same for measuring the rate of flow therethrough, said electric power supply being disposed and adapted to be varied until it coordinates the rise in pressure caused by the motor-driven impeller in the first of said looped conduits so as to counterbalance the pressure drop in the second of said looped conduits and stop the flow in said second looped conduit so that there is an indication of zero flow by said second flowmeter, whereby the first rate of flow through said first looped parallel conduit indicated by said first flowmeter represents the total flow through said main conduit adjacent said looped conduits when said second flowmeter indicates zero flow in said second looped parallel conduit.

11. Flow measuring apparatus to determine the rate of fluid flow between first and second spaced regions when there is a fluid pressure differential therebetween comprising, in combination, first and second conduit means each communicating between said first and second regions, a rotatable motor-driven impeller disposed in said first conduit means, variable power supply means coupled to the motor of said impeller to cause rotation thereof, flow responsive means disposed in said second conduit means indicating when there is a low rate of flow and when there is zero flow therein, said power supply means being variable to vary the speed of rotation of said impeller until it coordinates the rise in pressure in said second region caused by the motor-driven impeller in said first conduit means so as to counterbalance the pressure drop in said second conduit means and stop the flow through said second conduit means, and means to measure the power driving said motor of said impeller which is then representative of the rate of fluid flow through said first conduit means.

References Cited in the file of this patent

UNITED STATES PATENTS

| | | |
|---|---|---|
| 1,308,569 | Wylie | July 1, 1919 |
| 1,406,682 | Rathbone | Feb. 14, 1922 |
| 1,440,778 | Foster | Jan. 2, 1923 |
| 1,652,472 | Erwin et al. | Dec. 13, 1927 |
| 2,197,818 | Tozier | Apr. 23, 1940 |
| 2,281,801 | Reynolds et al. | May 5, 1942 |
| 2,361,195 | Grebe | Oct. 24, 1944 |
| 2,379,138 | Fitting et al. | June 26, 1945 |
| 2,415,729 | Dana | Feb. 11, 1947 |
| 2,580,182 | Morgan et al. | Dec. 25, 1951 |